March 17, 1936.  W. S. FISHER  2,034,335
CONTROL MECHANISM
Filed Jan. 30, 1932  3 Sheets-Sheet 2

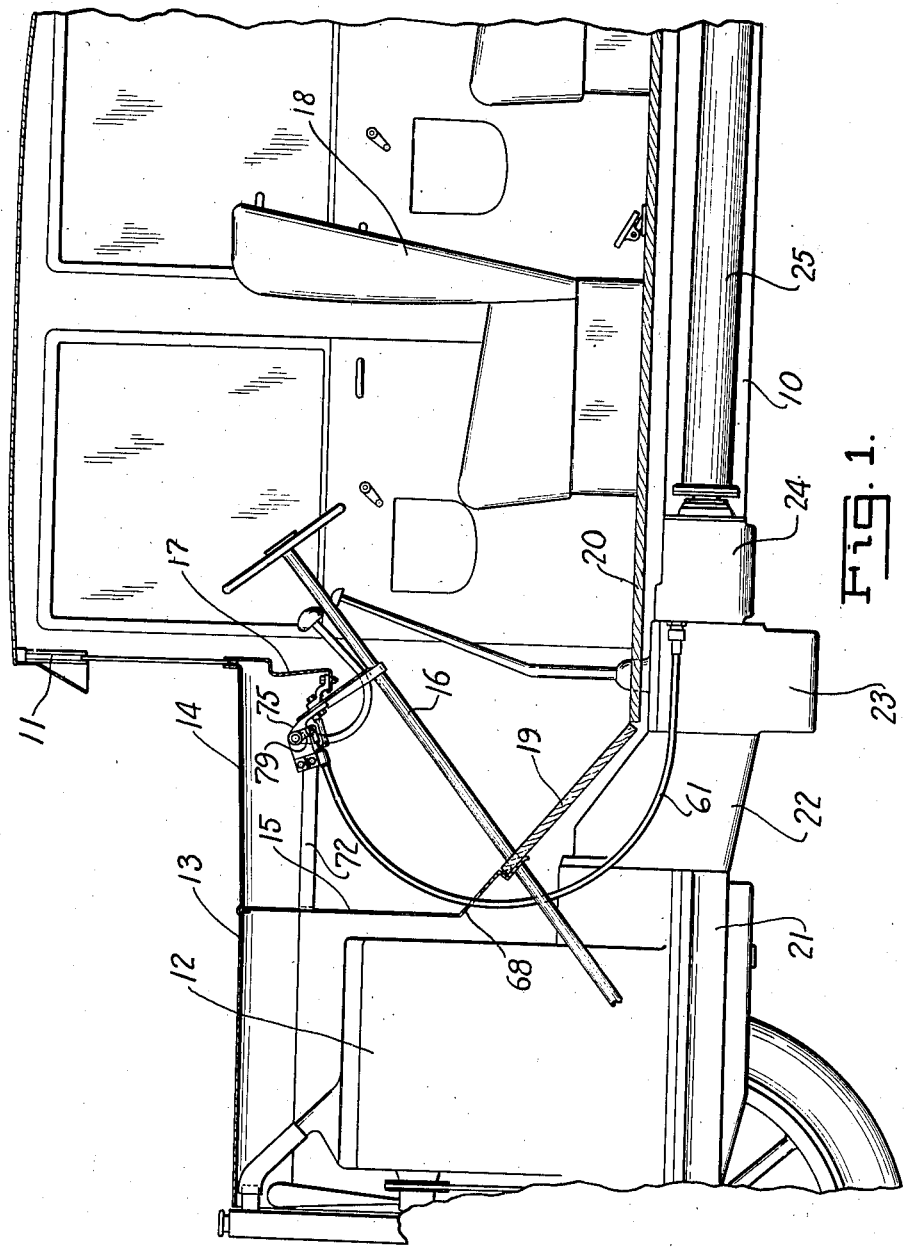

Inventor
Walter S. Fisher
By Chester H Braselton
Attorney

March 17, 1936.  W. S. FISHER  2,034,335
CONTROL MECHANISM
Filed Jan. 30, 1932  3 Sheets-Sheet 3
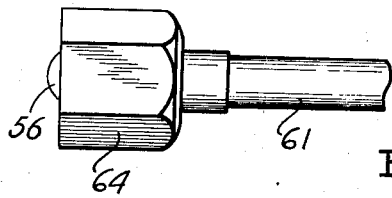
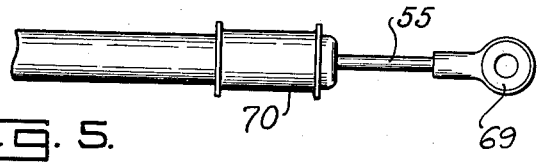
Fig. 5.
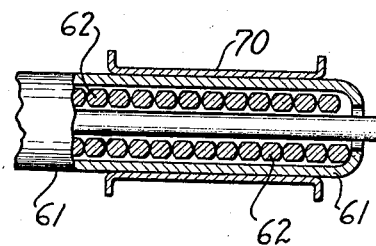
Fig. 6.
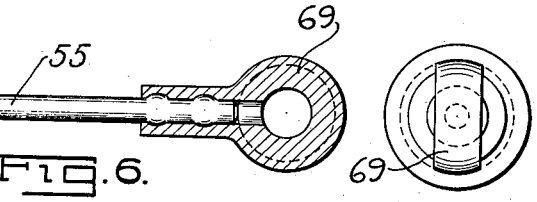
Fig. 7.
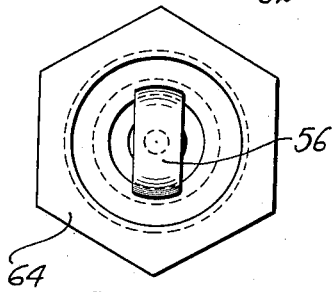
Fig. 9.
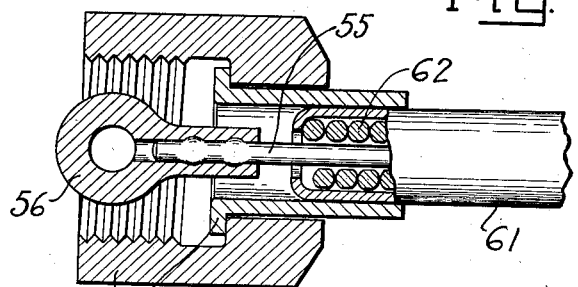
Fig. 8.
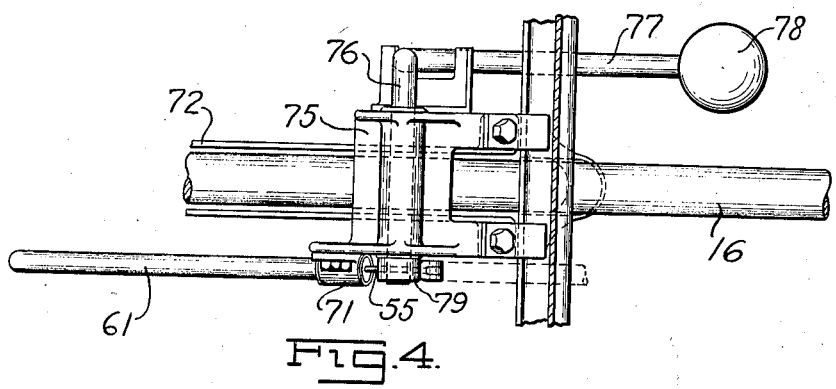
Fig. 4.
Inventor
Walter S. Fisher
By Chester H Braselton
Attorney Patented Mar. 17, 1936

2,034,335

UNITED STATES PATENT OFFICE 2,034,335

CONTROL MECHANISM

Walter S. Fisher, Toledo, Ohio, assignor to The Willys-Overland Company, Toledo, Ohio, a corporation of Ohio Application January 30, 1932, Serial No. 589,959

2 Claims. (Cl. 74—501)

This invention relates to control mechanisms and particularly to mechanisms for controlling power transmission arrangements especially adaptable for automotive vehicle installations.

The invention relates to the provision of means for controlling a clutch arranged in a power transmission mechanism and embraces a lever actuated arrangement for establishing or dis-establishing a positive power transmission connection.

The invention comprehends an improvement in control mechanisms for rendering effective or ineffective an automatic or overrunning clutching means of a type employed for connecting or disconnecting the prime mover or power source to the driving mechanism under certain conditions.

The invention has for a further object the provision of a controlling device of this character which is simple and inexpensive to manufacture and of a type suitable for installation adjacent the operator's position of the vehicle to facilitate the ease of manipulation of the control.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawings of a form of the invention, which may be preferred, in which:

Figure 1 is a side sectional view illustrating a portion of an automotive vehicle incorporating the structure of my invention;

Figure 4 is a plan view of certain parts illustrated in Figure 3;

Figure 5 is a plan view of flexible cable construction forming an element of the control of my invention;

Figure 6 is an enlarged sectional view showing one end of the cable arrangement;

Figure 7 is an end view of the parts shown in Figure 6;

Figure 8 is an enlarged sectional view showing the other end of the cable arrangement and particularly a connecting means.

Figure 9 is an end view of the parts shown in Figure 8.

Figure 3:
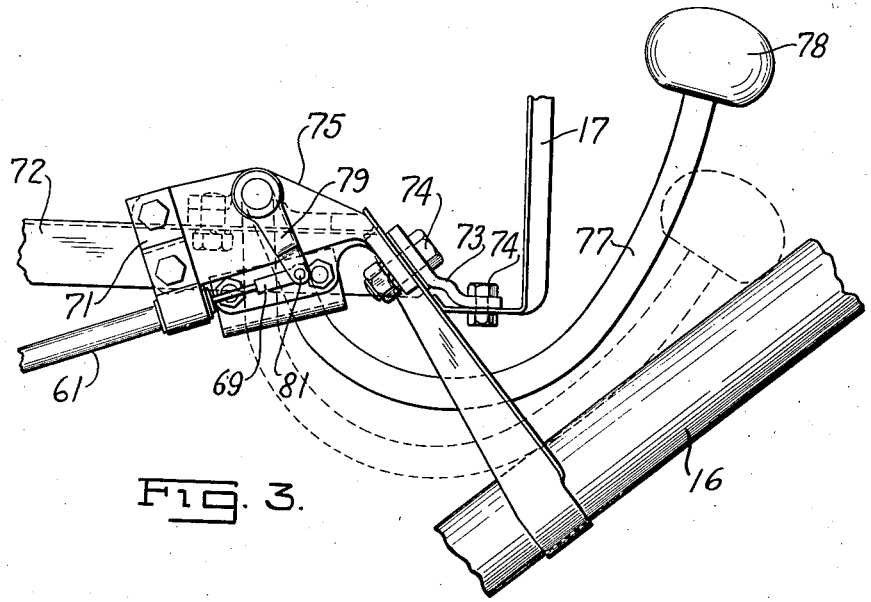
Figure 3 is a fragmentary side view through the instrument board of the vehicle showing the control arrangement of my invention.

I have shown the control arrangement of my invention as particularly adapted for selectively controlling the operation of a so-called overrunning or one-way clutch for use in connecting and disconnecting the source of power or prime mover with the driving wheels of an automotive vehicle, but it is to be understood that I contemplate the use of the control arrangement of my invention with other mechanisms or in any arrangement where the same may be found to be particularly adaptable.

Referring to the drawings in detail and particularly Figure 1 thereof I have shown the device of my invention as incorporated in an automotive vehicle comprising a chassis 10; a body 11; an engine or prime mover 12 suitably enclosed within a hood member 13; a cowl member 14; dashboard 15; steering post 16; instrument board 17, the operator's seat being indicated by numeral 18. Positioned beneath the floor boards 19 and 20 is the engine crank case 21, the usual clutch housing 22, transmission or gear set housing 23, the one-way clutch or free wheeling mechanism housing 24 and propeller or power transmission shaft 25 for transmitting the power to the rear wheels (not shown). As the engine and transmission arrangement or gear set are of usual construction they will not be described in detail, but only so far as to show the connection of my invention therewith.

Figure 2:
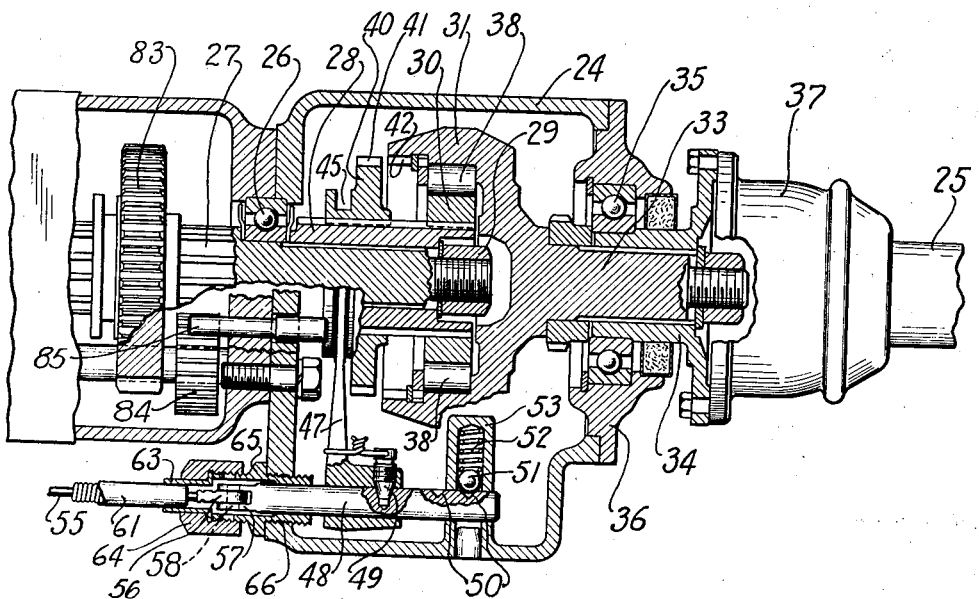
Figure 2 is a sectional plan view of an overrunning clutch or free wheeling arrangement as incorporated in an automotive vehicle, certain parts being shown in section and particularly illustrating a portion of the control means of my invention as applied thereto.

The so-called free wheeling or one-way clutch arrangement is especially illustrated in Figure 2, the mechanism being enclosed within a housing 24 in which is journalled in a bearing 26, a splined shaft 27, one end of which projects into the housing 24, and splined thereto is sleeve 28 which is held in place by means of a nut 29. The outer periphery of sleeve 28 is splined, and fixedly secured to one end of the sleeve upon the splined portion is the inner cage 30 of a one-way clutch arrangement, the outer cage of the clutch being designated by numeral 31, the latter being formed with a shaft-like portion 33 which is secured to a flanged sleeve 34, the latter being journaled in bearings 35 carried by an end cover plate 36 secured to the housing 24. The flanged portion of member 34 is secured to a member 37 which houses and forms a part of a universal joint mechanism (not shown) which in turn is connected to the propeller or drive shaft 25 so as to transmit power to the rear wheels (not shown) of the vehicle. The over-running clutch construction illustrated comprises a series of rollers 38 positioned between the inner and outer clutch cages 30 and 31 and are arranged to transmit power from shaft 27 through sleeve 28 to member 31 when the parts are rotated in one direction, and arranged to automatically disengage when member 31 is rotating at a greater speed than sleeve 28 thus permitting a so-called "coasting" or free wheeling action between the rear wheel drive and the engine and transmission mechanism.

Means are also provided for positively mechanically joining or connecting sleeve 28 with the clutch cage 31 comprising a member 40 slidably splined upon sleeve 28, the member 40 having an irregular or toothed periphery 41 which is arranged to be received in an interiorly toothed portion 42 of the clutch cage 31. Thus, when member 40 is slidably moved to the right so that tooth portion 41 engages the corresponding tooth portion 42, a positive driving connection is established between the transmission shaft 27, clutch cage 31 and propeller or drive shaft 25, thus forming a positive drive connection between the engine and the drive wheels of the vehicle.

The operating means for moving member 40 to permit operation of the free wheeling action or initiate the positive drive connection will now be described. The member 40 is provided with a circumferential groove 45 which loosely receives a bifurcated end of a shifting member 47, the latter being fixedly secured to a longitudinally movable shaft 48 by means of a pin 49, the pin serving to prevent any relative movement between shaft 48 and shifting member 47. Referring particularly to Fig. 2, when member 48 is moved to the right the toothed periphery 41 of member 40 will be moved into engagement with the correspondingly internally toothed configuration 42 of member 31 to provide a positive drive connection from the transmission shaft 27 to the propeller shaft 25. Figure 2 illustrates the parts in free wheeling position, that is with member 40 out of engagement with member 31. The member 48 is resiliently retained in its two positions by means of indentations 50 which are selectively engaged by ball detent 51 resiliently urged into contact with member 48 by means of coil spring 52 positioned in the bore of a boss 53 forming a part of housing 24.

The shaft 48 is connected to suitable operating means for actuating the member 40 which means comprises a flexible cable 55 to the end of which is secured an eye 56 the latter being received into a furcation 57 formed on one end of member 48, the eye and member 48 being held together by means of a pin 58. This construction is illustrated in detail in Figures 2 and 5 through 9, inclusive.

The flexible cable 55 is surrounded by the casing 61 and a flexible element 62 fabricated of coiled material as for example spring wire or the like. The inner diameter of the coiled material is of a dimension to slidably yet snugly receive the cable 55 so as to permit longitudinal movement of the latter therethrough without substantial lost motion. Adjacent one end of the casing 61 and surrounding the same is a flanged member 63 which slidably carries a nut 64 adapted to be threaded upon a projection of a fitting 65 which is threaded into the housing 24 as at 66, the bore of the fitting 65 also acting as a bearing for guiding the shaft 48. A flange of the spool like member 63 is brought into fixed contact with the extremity of the fitting 65 so as to hold the casing 61 surrounding cable 55 in fixed relation with the fitting 65. The casing 61 containing the operating cable 55 passes through an opening 68 in the floor board 19 to a point immediately back of the instrument board 17 of the vehicle.

The upper end of casing 61 terminates at the rear of the instrument board 17 and is provided with a flanged spool like member 70 secured thereto, the latter being carried by a bracket 71 which in turn is carried by bracket 75. By this means the upper end of the casing 61 is fixedly anchored thus preventing any relative movement of the same.

Positioned between the instrument board 17 and dash board 15 is a brace or member 72 preferably of channel formation which is secured by means of an angle bracket 73 and bolts 74 to the instrument board as particularly illustrated in Figure 3. Secured to the upper portion of the brace 72 and nearest the instrument board is a bracket 75 having a transverse bore within which is journalled an operating arm 76 having an extension 77 extending beneath and forwardly of the instrument board and terminating in a manipulating handle or knob 78. Secured to the extremity of the member 76 is a downwardly projecting arm 79 the lower end of which is bifurcated and receives an eye 69 fixed to the upper end of the operating cable 55, the eye being secured to the arm 79 by means of a pin 81. By this means the flexible cable 55 operatively connects the manipulating handle 77 with the slidable shaft 48 in the housing 24. It is to be noted that as the handle 77 is of much greater length than the arm 79 that a multiplication of leverage ratio is obtained which facilitates the ease of operation of the mechanism.

The operation of the device is as follows: When the control mechanism is in the position shown in full lines in Figure 3 with the handle member 77 moved to a position nearest the instrument board, the member 40 is in the position indicated in Figure 2 out of engagement with the teeth 42 of the clutch element 31. In this position the propeller shaft 25 and drive mechanism connected to the drive wheels of the vehicle is connected with the transmission shaft 27 only through the overrunning clutch mechanism comprising members 30 and 31 inter-connected through the clutch rollers 38 so that an operative driven connection is established in only the drive direction of rotation of the transmission shaft 27 connected to the engine. In this position should the engine for any reason be decelerated, the transmission shaft 27 would be correspondingly decelerated and through the medium of the over-running clutch rollers 38 member 30 would be automatically disconnected from member 31 and the latter would be caused to "over-run" and permit "coasting" or free wheeling of the vehicle without engine connection. Whenever the engine is accelerated to bring shaft 27 to a speed equal to the speed of member 31 the one-way drive will again be established to create an operative drive connection. In order to render the over-running clutch hereinbefore described inactive, it is only necessary to move the manipulating lever 77 to the position shown in dotted lines in Figure 3, which movement causes a movement of arm 79, cable 55 and shaft 48, thus shifting fork 47 to move member 40 toward member 31 thereby interengaging teeth 41 of member 40 and teeth 42 of member 31 to establish a positive drive connection from transmission shaft 27 to member 31 and propeller or drive shaft 25, in which position the over-running clutch mechanism becomes ineffective. With the lever 77 in the position above mentioned a positive drive connection is established between shaft 27 and member 31 at all times.

It is obvious that when the gear shifting mechanism of the transmission (not shown) is moved to a "reverse drive connection" that the over-running clutch would be ineffective to transmit operative force from the transmission shaft 27 to the propeller shaft 25. It is therefore essential that when the gear shifting mechanism is shifted to a "reverse" position, the member 40 must be in engagement with member 31. In event the operator of the vehicle inadvertently fails to move the manipulating lever 77 to the proper position the shifting of gear 83 on shaft 27 into engagement with reverse gear 84 brings the lateral surface of gear 83 into contact with one end of a pin 85 and moves the pin in an axial direction toward member 40, the other end of the pin engaging member 40 moves the latter automatically into inter-engaging relationship with member 31 to establish the positive drive connection necessary when the mechanism is in "reverse" drive position. The member 40 will remain in inter-engaged position with member 31 until the gear shifting mechanism is taken out of "reverse" drive position and the handle member 77 moved to the position indicated in full lines in Figure 3 to cause a disengagement of member 40 from member 31.

It is apparent that, within the scope of the invention, modifications and different arrangements may be made other than is herein disclosed, and the present disclosure is illustrative merely, the invention comprehending all variations thereof.

What I claim is:

1. A control mechanism comprising a flexible cable; an operating lever; one end of said cable being operatively connected to said lever; the other end of said cable adapted to be connected to mechanism to be controlled; a sheath for said flexible cable comprising a metallic tube through which said cable extends, said tube having its end portions flanged inwardly; means interposed between said tube and said cable comprising an element of coiled material engageable with the inturned flanged ends of said tube whereby said coiled material is restrained from longitudinal movement with respect to said tube.

2. A control means for clutch mechanism comprising a flexible cable, one end of said cable being operatively connected to said clutch mechanism; an operating lever; the other end of said cable being operatively connected to said lever; a flexible guiding sheath for said flexible cable comprising a metallic tube through which said cable extends, said tube having its end portions flanged inwardly; means interposed between said tube and said cable comprising spirally wound material engageable with the inturned flanged ends of said tube whereby said coiled material is restrained from longitudinal movement with respect to said tube.

WALTER S. FISHER.